United States Patent
Suh et al.

(10) Patent No.: US 10,393,006 B2
(45) Date of Patent: Aug. 27, 2019

(54) VARIABLE POSITION SHIFT TYPE VARIABLE CHARGE MOTION SYSTEM AND ENGINE

(71) Applicants: Hyundai Motor Company, Seoul (KR); Kia Motors Corporation, Seoul (KR)

(72) Inventors: In-Gee Suh, Yongin-si (KR); Woo-Tae Kim, Anyang-Si (KR); Min-Gi Choi, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 127 days.

(21) Appl. No.: 15/831,705

(22) Filed: Dec. 5, 2017

(65) Prior Publication Data

US 2019/0112969 A1    Apr. 18, 2019

(30) Foreign Application Priority Data

Oct. 17, 2017  (KR) .......................... 10-2017-0134405

(51) Int. Cl.
*F02B 31/04*      (2006.01)
*F02M 35/10*     (2006.01)

(52) U.S. Cl.
CPC ....... *F02B 31/04* (2013.01); *F02M 35/10262* (2013.01); *F02B 2275/48* (2013.01)

(58) Field of Classification Search
CPC ...... F02B 31/04; F02B 31/06; F02B 2275/48; F02B 2023/106; F02B 2023/107; F02M 35/10262; F02M 35/10118; F01L 1/267; F01L 1/34; F02D 13/0219; F02D 13/0269
See application file for complete search history.

(56) References Cited

U.S. PATENT DOCUMENTS

| | | | | |
|---|---|---|---|---|
| 6,006,721 | A * | 12/1999 | Shannon | .................. F02B 31/06 123/188.14 |
| 2017/0284332 | A1* | 10/2017 | Chu | .................... F02D 41/0002 |
| 2017/0306902 | A1* | 10/2017 | Chu | ................. F02M 35/10177 |
| 2018/0051623 | A1* | 2/2018 | Zhang | ....................... F01L 3/20 |
| 2018/0112587 | A1* | 4/2018 | Zhang | .............. F02M 35/10262 |

FOREIGN PATENT DOCUMENTS

| | | |
|---|---|---|
| JP | 3367288 B2 | 1/2003 |
| JP | 2007278131 A | 10/2007 |
| KR | 20020053721 A1 | 7/2002 |
| KR | 101393571 B1 | 5/2014 |

\* cited by examiner

*Primary Examiner* — George C Jin
(74) *Attorney, Agent, or Firm* — Morgan, Lewis & Bockius LLP

(57) ABSTRACT

A variable charge motion system may include a sliding plate positioned internal to a pipeline of an intake port connected to a combustion chamber, and slide and moved to induce a tumble flow with respect to an intake flow of the air which flows the pipeline and enters into the combustion chamber, wherein the sliding plate is positioned along a guide wall formed in the pipeline.

16 Claims, 6 Drawing Sheets

VARIABLE POSITION SHIFT TYPE VARIABLE CHARGE MOTION SYSTEM AND ENGINE

CROSS-REFERENCE TO RELATED APPLICATION

The present application claims priority to Korean Patent Application No. 10-2017-0134405, filed on Oct. 17, 2017, the entire contents of which is incorporated herein for all purposes by this reference.

BACKGROUND OF THE INVENTION

Field of the Invention

The present invention relates to a variable charge motion system and more particularly, to an engine applying a variable charge motion system that a variation of the strength of tumble flow is continuously controlled by a variable position shift with respect to an intake pipeline.

Description of Related Art

Generally, a Variable Charge Motion System or a Variable Control Module System (hereinafter, VCM) for a vehicle is applied for enhancing fuel efficiency along with engine performance.

As an example, the VCM is configured to include, a power transfer mechanism (for example, a link mechanism), and a VCM controller for a motor control along with a motor generating a rotating power, a flap (or a valve) hinging a pipeline of an intake manifold and adjusting the area of the pipeline. In the instant case, an opening status according to a hinging operation of the flap forms a low tumble flux by a maximal opening of the pipeline, while a closing status forms a high tumble flux by a maximal closing of the pipeline. The VCM of the method is called a flap-type VCM.

Accordingly, the flap-type VCM, in the hinging operation of the flap by the motor control, is developed to form a tumble flow of a high-low status in an intake air supplied to an engine; and the tumble flow enhances a mixture status of an air and a fuel within a cylinder, enhancing a combustion characteristic of the engine.

However, the flap-type VCM may not help have the limitation that the hinging operation of the flap for forming the tumble flow is performed by an ON/OFF method to generate only two tumble strengths of the high-low tumble flow.

The limitation of the two tumble strengths may not correspond to the enhancement of a combustion speed which is being largely required in a recent trend which seeks to apply an Atkinson cycle or an Exhaust Gas Recirculation System (EGR) system and the like to a gasoline engine to enhance thermal efficiency of the gasoline engine. Consequently, there seeks the enhancement of a flow strength within the combustion chamber which corresponds to the enhancement of thermal efficiency of a recent gasoline engine using a design modification for an intake port or several installations.

Accordingly, the object of the present invention considering the above is to provide a variable position shift type variable charge motion system and an engine capable of applying a sliding plate disposed on the intake port and slide and moved to enhance the flow strength within the combustion chamber which corresponds to the enhancement of thermal efficiency of the gasoline engine without adding a hardware or excessively modifying a design, and adjusting the flow strength within a combustion chamber according to an operation region to continuously control a variation of the strength of the tumble flow.

The information disclosed in the present Background of the Invention section is only for enhancement of understanding of the general background of the invention and may not be taken as an acknowledgement or any form of suggestion that the present information forms the prior art already known to a person skilled in the art.

BRIEF SUMMARY

Various aspects of the present invention are directed to providing a variable charge motion system including a sliding plate positioned internal to a pipeline of an intake port connected to a combustion chamber, and slide and moved for inducing a tumble flow with respect to an intake flow of the air which flows the pipeline and entering into the combustion chamber.

As a preferable embodiment, a distance of the sliding movement is adjusted by an engine operating condition of an engine.

As a preferable embodiment, the sliding movement of the sliding plate is performed by being formed on the intake port and disposed along a guide wall dividing the pipeline to weaken the interference with respect to the air flowing the pipeline.

As a preferable embodiment, in the case that the sliding plate moves to an intake flow direction of the pipeline by the sliding movement following the guide wall, a interference weakens. The guide wall is formed with a port end portion into which an edge portion of the sliding plate is inserted.

As a preferable embodiment, the guide wall is formed with a tumble protrusion forming a gap at the status that an edge portion of the sliding plate is inserted into the port end portion and protrudes to the pipeline.

As a preferable embodiment, in the case that the sliding plate moves to an reverse intake flow direction of the pipeline by a sliding movement following the guide wall, a interference weakens. An internal space of the guide wall is formed with a port boss end portion adhered at the status that the edge portion of the sliding plate is inserted.

As a preferable embodiment, the sliding movement is performed by a pulley connected to the sliding plate; and the pulley is rotated to the center axis of a rotation shaft. The pulley and the sliding plate are connected by a fixing plate; and the fixing plate is bent on the sliding plate. The fixing plate and the pulley are connected as a fitting structure.

And, an engine according to an exemplary embodiment of the present invention for achieving the object may include a cylinder formed with a combustion chamber by the connection of a cylinder block and a cylinder head; and a variable charge motion system disposed on an intake port forming the intake flow sent to the cylinder to convert the intake flow into a tumble flow by the sliding movement with respect to the intake port.

As a preferable embodiment, the variable charge motion system may include a moving member slide and moved within the pipeline of the intake port to form the tumble flow; a rotation member connected to the moving member and rotated to form the sliding movement; an actuator rotating the rotation member; and a controller configured for controlling the actuator by a PWM DUTY outputted by corresponding to an engine operating condition which is determined by a detection signal, as an input data, of an engine-mounted detector.

As a preferable embodiment, the controller is associated with a VCM map provided with a table, in which an engine operating condition step and the output value of the PWM DUTY are matched; and the detection signal of the engine-mounted detector applies the rotation number of the engine, a vehicle speed, a throttle opening amount, an APS, an engine cooling water temperature, and an intake air temperature.

As a preferable embodiment, the moving member may include first and second moving members that are formed on each of the intake ports connected to the left and right combustion chambers of the cylinder and together operated by the connection of the rotation member. The rotation member is supported by the cylinder head and rotated. The rotation member rotates each of the first and second moving members in the clockwise direction or in the counter-clockwise direction to generate the sliding movement.

The engine according to an exemplary embodiment of the present invention may continuously control, in the variable charge motion system, the variation of the strength of the tumble flow by a variable plate position adjustment according to an engine operating condition, more efficiently performing the adjustment of the intake flow compared to the conventional VCM of the ON/OFF method.

Furthermore, the engine according to an exemplary embodiment of the present invention does not require a design modification for the intake port or usage of several installations, even while being continuously varied from an initial strong status to a weaken status according to the plate position slide and adjusted using, in the variable charge motion system, the sliding plate disposed on a lower surface of the intake port and the tumble strength.

Furthermore, the engine according to an exemplary embodiment of the present invention may apply the variable charge motion system not requiring a design modification for the intake port or the usage of several installations, satisfying the enhancement of thermal efficiency of the gasoline engine recently pursued.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
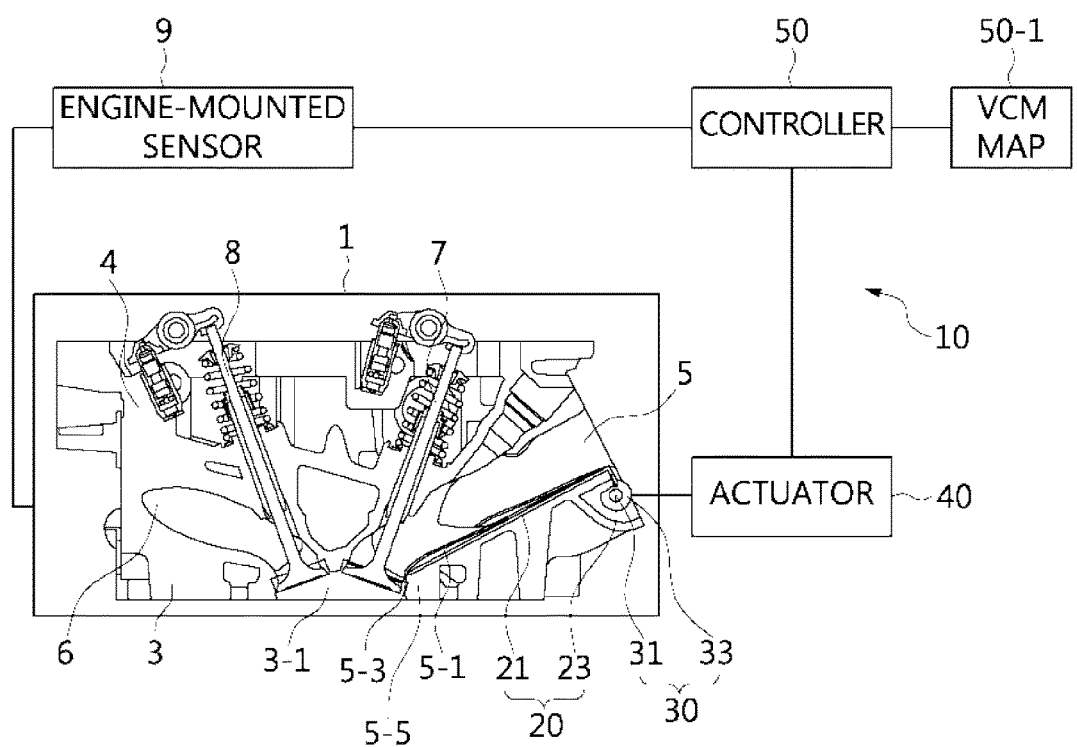
FIG. 1 is a configuration view illustrating a variable position shift type variable charge motion system applied to an engine according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIG. 1, a Variable Charge Motion System or a Variable Control Module System (hereinafter, VCM) 10 has the characteristic which is applied to an engine 1 to continuously vary the strength of a tumble flow of the air (that is, the new air filtered) entering into a cylinder 3-1 in a variable position shift method. In the instant case, the strength of the tumble flow forms the strongest magnitude of an engine Revolution Per Minute (RPM) in an initial operation of the engine, and then is adjusted to a gradual weaken strength according to the increment of the engine RPM.

The engine 1 includes a cylinder block 3 with a plurality of cylinders 3-1 forming a combustion chamber, a cylinder head 4 connected to the cylinder block 3 for forming an upper portion of the cylinder 3-1, intake/exhaust ports 5, 6 positioned on the left and right upper portions of the cylinder 3-1 on the cylinder head 4, and intake/exhaust valves 7, 8 opening or closing each of the intake/exhaust ports 5, 6. Accordingly, although the engine 1 is the same as or substantially the same as a conventional engine, it has a difference that the VCM 10 varies a plate position on the intake port 5 by a sliding movement to adjust a more efficient intake flow by a continuous variation of the strength of the air tumble flow which corresponds to an engine operating condition compared to air tumble formation by a conventional ON/OFF.

The VCM 10 is a basic component for the continuous variation of the strength of the air tumble flow which corresponds to a moving member 20 and a rotation member 30 to the engine operating condition; and has, as an additional component, a controller 50 associated with a VCM map 50-1 for a precise sliding movement control with respect to the moving member 20 along with an actuator 40 for enhancing a power transfer efficiency with respect to the rotation member 30. In the instant case, it means that the basic component may be applied as it is and the additional component may be changed or also substituted.

As an embodiment, the moving member 20 includes a sliding plate 21 and a fixing plate 23 integrally formed with the sliding plate 21 and bent on one edge portion of the sliding plate 21. The sliding plate 21 is lengthily disposed along a guide wall 5-1 of the intake port 5; and the fixing plate 23 is extracted to an outside of the intake port 5 and connected to the rotation member 30. The rotation member 30 includes a rotation shaft 31 and a pulley 33 connected to a range of one edge portion of the rotation shaft 31 and fixed with the fixing plate 23 of the moving member 20. Each of the rotation shaft 31 and the pulley 33 forms a circle-type cross section.

Figure 4:
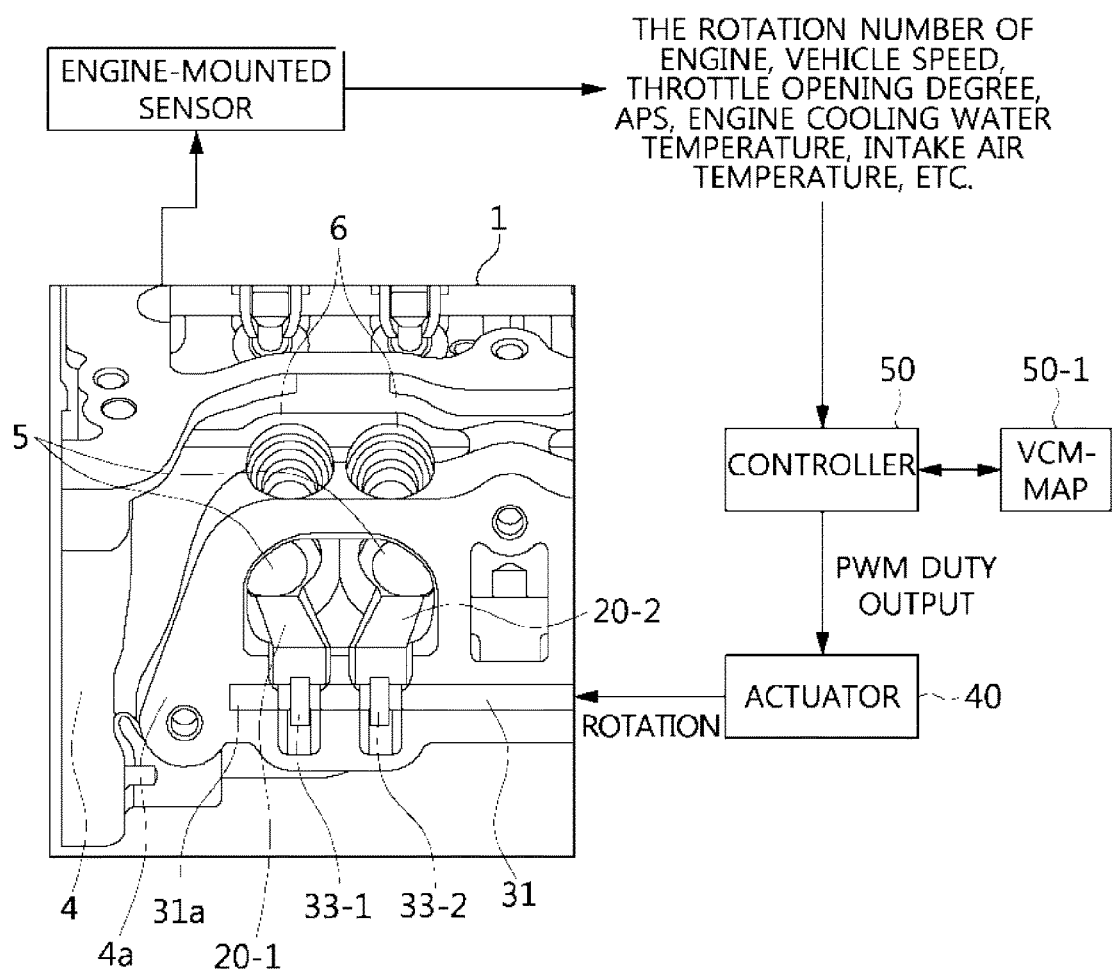
FIG. 4 is a view illustrating a control status of the variable charge motion system according to an exemplary embodiment of the present invention.

As an embodiment, the actuator 40 is configured as an electric motor to be rotated or as a solenoid to perform a linear reciprocating movement for performing forward/backward rotation of the rotation shaft 3 of the rotation member 30, and is precisely controlled by a Pulse Width Modulation (PWM) DUTY of the controller 50. The actuator 40 may be integrally formed with the rotation shaft 31 to form the rotation member 30. The controller 50 processes, as an input data, a detection signal of an engine-mounted detector 9 for determining the engine operating condition; and is associated with the VCM map 50-1 provided with a table, in which the engine operating condition step and an output value of the PWM DUTY are matched, to control an output of the actuator 40 for controlling the rotation shaft 31. The detection signal, as illustrated in FIG. 4, includes the rotation number of the engine, a vehicle speed, a throttle opening amount, an Accelerator Pedal Scope (APS), an engine cooling water temperature, and an intake air temperature.

Figure 2:
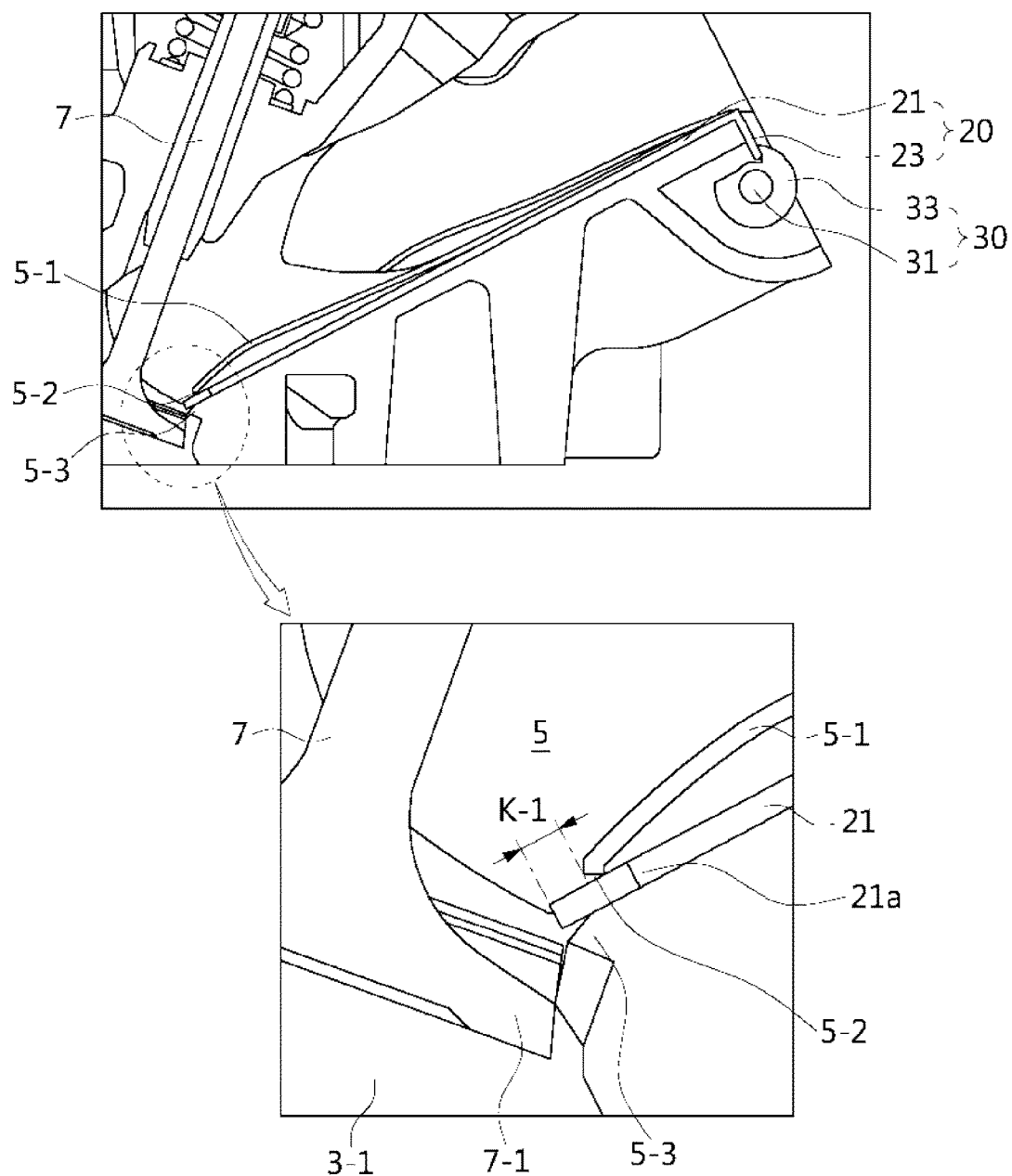
FIG. 2 is a view illustrating an example that the variable charge motion system according to an exemplary embodiment of the present invention is configured so that a moving member becomes the pulling movement (the retreation movement) to vary tumble formation.

Referring to FIG. 2, the moving member 20 is associated with the intake port 5 by the sliding plate 21 and associated with the rotation member 30 by the fixing plate 23.

The sliding plate 21 is configured as a straight-shaped plate structure; and divides an edge portion thereof into a tumble end portion 21a for a tumble inducing protrusion interval (K−1), and the sliding plate 21 maintains the status protruded toward a pipeline (that is, an airflow space) side of the intake port 5 at an initial position. A protrusion length of the tumble inducing protrusion interval (K−1), as a setting value, corresponds to a tumble strength required by the specification of the engine.

For the present purpose, the intake port 5 forms a guide wall 5-1, a port end portion 5-2, and a tumble protrusion 5-3 while forming the pipeline that the air is sent to the cylinder 3-1.

The guide wall 5-1 is integrally formed on the intake port 5 so that the pipeline is divided into an internal space of the airflow with respect to an outside space. The port end portion 5-2 is formed on the portion drilled on the guide wall 5-1. Accordingly, the guide wall 5-1 makes the sliding plate 21, at the status which is lengthily disposed along the intake port 5 in the outside of the pipeline, slide and moved; and the port end portion 5-2 makes the tumble inducing protrusion interval (K−1) of the sliding plate 21 formed as an initial status that comes out and protruded from the guide wall 5-1. The tumble protrusion 5-3 is formed toward a cylinder upper end portion wall 5-5 side of the cylinder 3-1, and at the initial status of the sliding plate 21, forms a gap with the tumble inducing protrusion interval (K−1). Accordingly, the gap is associated with the tumble inducing protrusion interval (K−1) to at the initial status of the sliding plate 21, contribute to strengthen the tumble flow. The cylinder upper end portion wall 5-5 upon closing of an intake valve 7, is adhered with a valve tappet 7-1 to block the intake port 5. In the instant case, the valve tappet 7-1 means the portion including an end portion of a valve stem.

The fixing plate 23 is integrally formed with the sliding plate 21 and formed as a structure bending the sliding plate 21 on an opposite side portion of the tumble inducing protrusion interval (K−1), and connected to a pulley 33 of the rotation member 30 to slide and move the sliding plate 21 in the rotation direction of the pulley 33.

For the present purpose, the pulley 33 of the rotation member 30 is formed with a pulley groove 34 (referring to FIG. 3) and an end portion of the fixing plate 23 is fitted into the pulley groove 34 as a fitting structure to be fixed with the pulley 33.

Figure 3:
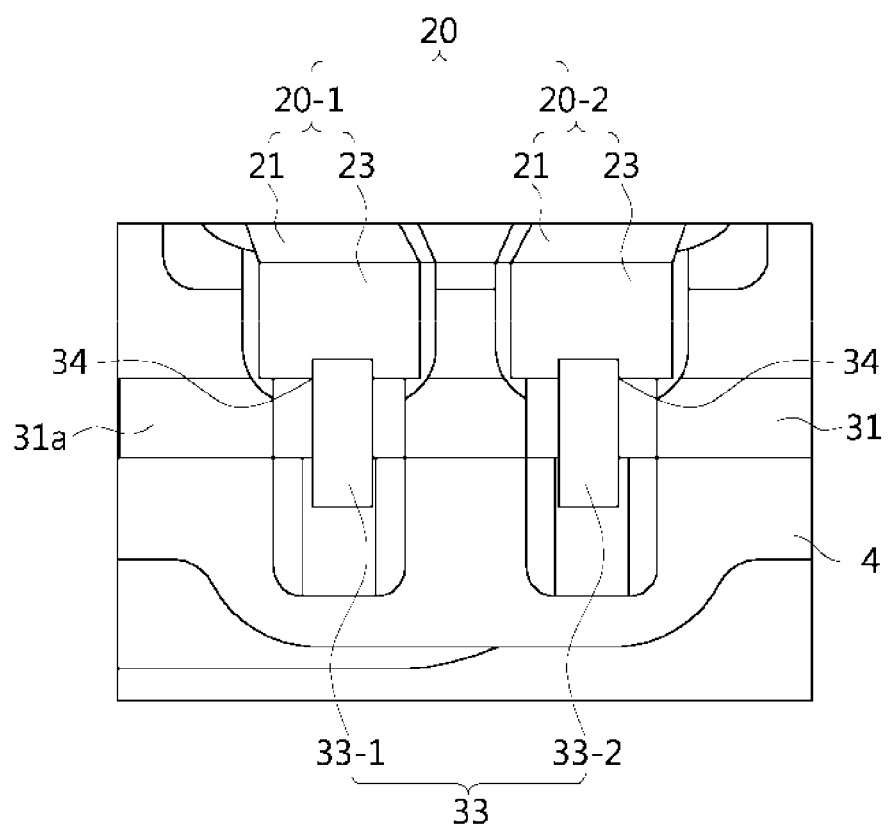
FIG. 3 is a view illustrating an example of the arrangement status of a cylinder of the variable charge motion system according to an exemplary embodiment of the present invention.

Meanwhile, FIG. 3 is a view illustrating an application example of the VCM 10 to the engine 1 as the cylinder arrangement status of the moving member 20 and the rotation member 30.

As illustrated, the moving member 20 forms one pair as two of first and second moving members 20-1, 20-2 and also on the rotation member 30, the pulley 33 includes two of first and second pulleys 33-1 33-2. Accordingly, in a case of dividing a combustion space of the cylinder 3-1 into left and right portions, the first moving member 20-1 is positioned in a left combustion chamber space and the second moving member 20-2 is positioned in a right combustion chamber space.

And, each of the first and second moving members 20-1, 20-2 identically includes the sliding plate 21 with the fixing plate 23 being bent formed; and each of the first and second pulleys 33-1, 33-2 has the pulley groove 34 dug and is fixed with the fixing plate 23 of the first moving member 20-1 and the fixing plate 23 of the second moving member 20-2, respectively. Accordingly, the sliding plate 21 of the first moving member 20-1 is positioned in the left combustion chamber space to be inserted into an internal to the guide wall 5-1 of the intake port 5 connected to the left combustion chamber space; and the sliding plate 21 of the second moving member 20-2 is positioned in the right combustion chamber space to be inserted into an internal space of the pipeline of the guide wall 5-1 of the intake port 5 connected to the right combustion chamber space and positioned on an outside of the pipeline of the intake port 5.

Furthermore, the rotation shaft 31 of the rotation member 30 includes a shaft end portion 31a extending in the region to which the first and second pulleys 33-1, 33-2 are connected; the shaft end portion 31a is supported using a rod supporting rib 4a (referring to FIG. 4) of the cylinder head 4 to stably perform the rotation by the actuator 40. Although the connection of the shaft end portion 31a and the rod supporting rib 4a is configured as a rotatable structure being a free-rotatable, it is preferable to apply a bearing to a connected portion.

Meanwhile, FIG. 4 is a view illustrating an operation of the VCM 10 continuously, variably varying the strength of the tumble flow of the air in the operation of the engine 1.

As illustrated, the controller 50 receives the detection signal of the engine-mounted detector 9 as an input data; reads the rotation number of the engine, a vehicle speed, a throttle opening amount, an Accelerator Pedal Scope (APS), an engine cooling water temperature, and an intake air temperature; and matches each of the detected values with the table of the VCM map 50-1 to determine the engine operating condition with respect to a current engine 1. In the instant case, since the detailed determining procedure with respect to the engine operating condition deprives from the scope of the present invention, the operation of the controller 50 is limited to the variation of the PWM DUTY output sent to the VCM 10 according to the determined result of the engine operating condition.

Hereinafter, the magnitude of the PWM DUTY output of each of the engine operating condition generating in the controller 50 performs the clockwise rotation of the moving member 20 so that the strength of the tumble flow of the air entering into the cylinder 3-1 from the intake port 5 is gradually reduced from a maximum status; the clockwise rotation generates the sliding movement of the sliding plate 21 in the upper direction; and the movement in the upper direction is assumed to be varied so that the tumble inducing protrusion interval (K−1) of the sliding plate 21 enters into the space of the guide wall 5-1; and the reduction of the protrusion position of the tumble inducing protrusion interval (K−1) is defined as the retreation movement of the sliding plate 21.

Figure 5:
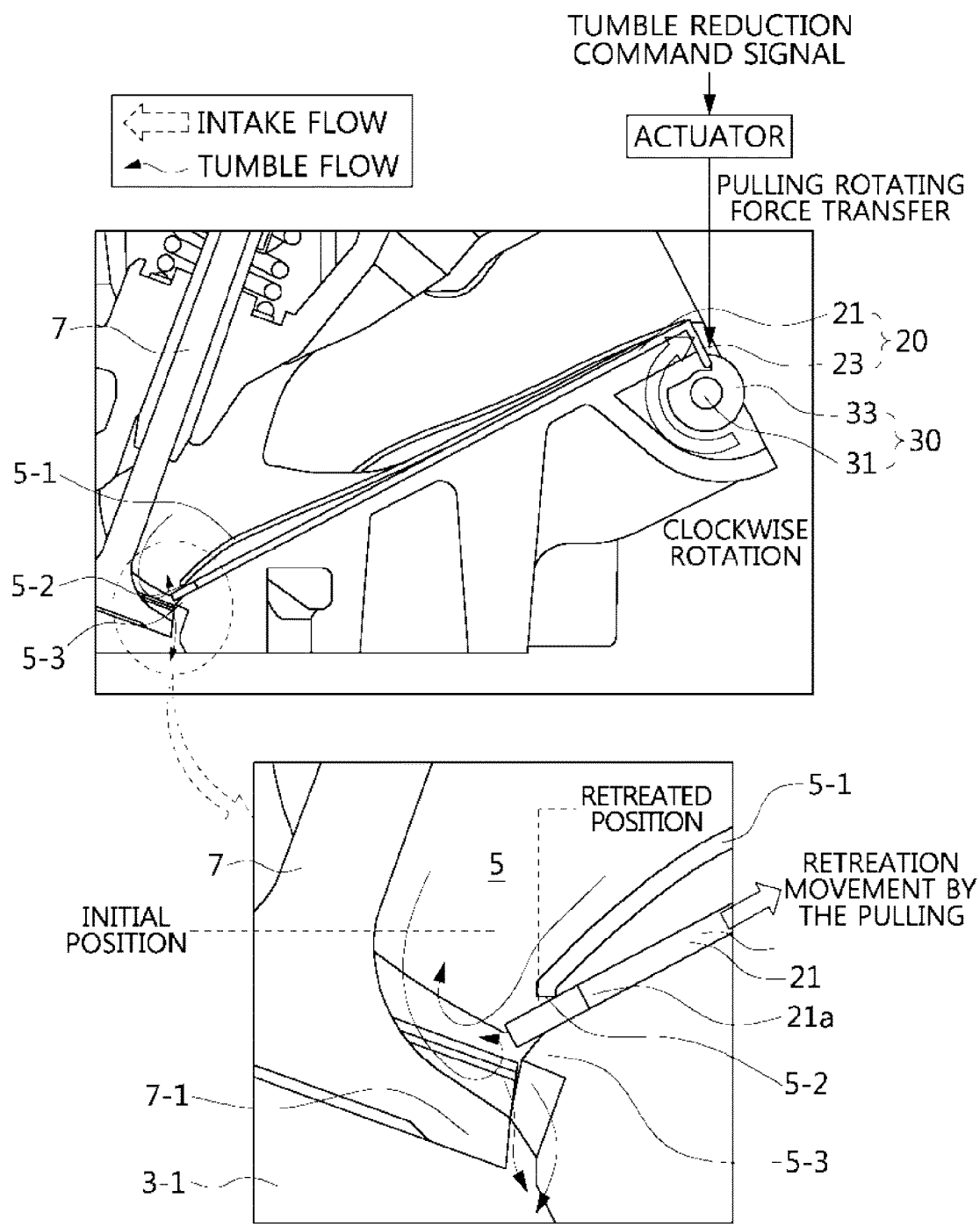
FIG. 5 is a view illustrating an operation status that the tumble formation of the variable charge motion system according to an exemplary embodiment of the present invention is varied by the pull movement (the retreation movement) of the moving member.

Referring to FIG. 5, at an initial operation status of the engine, the controller 50 does not operate the actuator 40 and the sliding plate 21 maintains an initial position. As such, the tumble inducing protrusion interval (K−1) at an initial position of the sliding plate 21 is maximally protruded to the space which is in communication with the cylinder 3-1 in the pipeline of the intake port 5 to disturb the airflow. Consequently, the tumble strength of the air supplied to the cylinder 3-1 is maintained as a high tumble flux of the maximally strong strength.

Next, the PWM DUTY output of each of the engine operating conditions of the controller 50 operates the actuator 40 and the rotation shaft 31 of the rotation member 30 is rotated in the clockwise direction thereof. In the instant case, the strength of the tumble flow is gradually weakened due to the increment of the engine RPM by the PWM DUTY output of each of the engine operating conditions. Furthermore, although the retreation movement of the sliding plate 21 identically occurs on each of the first and second moving members 20-1, 20-2, it will be explained as the moving member 20 for convenience of explanation.

Next, the clockwise rotation of the rotation shaft 31 rotates the pulley 33 and the fixing plate 23 of the moving member 20 fixed to the pulley 33 is pulled; the pulling of the fixing plate 23 pulls the sliding plate 21 and the sliding plate 21 becomes the retreation movement in the outside space of the pipeline formed by the guide wall 5-1; the retreation movement of the sliding plate 21 inserts the tumble inducing protrusion interval (K−1) into the port end portion 5-2 to reduce the protruded portion of the tumble inducing protrusion interval (K−1) covering the gap of the tumble inducing protrusion interval (K−1) and the tumble protrusion 5-3.

As such, the space which is in communication with the cylinder 3-1 in the pipeline of the intake port 5 weakens the interference effect by the tumble inducing protrusion interval (K−1); the weakness of the interference effect varies the airflow and the high tumble flux is converted into the low tumble flux. Additionally, the gap is not covered by the tumble inducing protrusion interval (K−1) and the formation of the low tumble flux may be facilitated.

Next, in the case that the controller 50 maximally retreats the sliding plate 21 under a high speed RPM condition to completely reduce the protruded portion of the tumble inducing protrusion interval (K−1), the interference effect of the tumble inducing protrusion interval (K−1) in the communicated space disappears and the air entering into the cylinder 3-1 in the pipeline is converted into the low tumble flux.

Accordingly, a fine position adjustment of the sliding plate 21 variably performed according to the engine operating condition using the variation of the PWM DUTY output of the controller 50 may more efficiently adjust the flow strength while continuously varying the tumble strength formed in the combustion chamber compared to the conventional VCM ON/OFF method.

Figure 6:
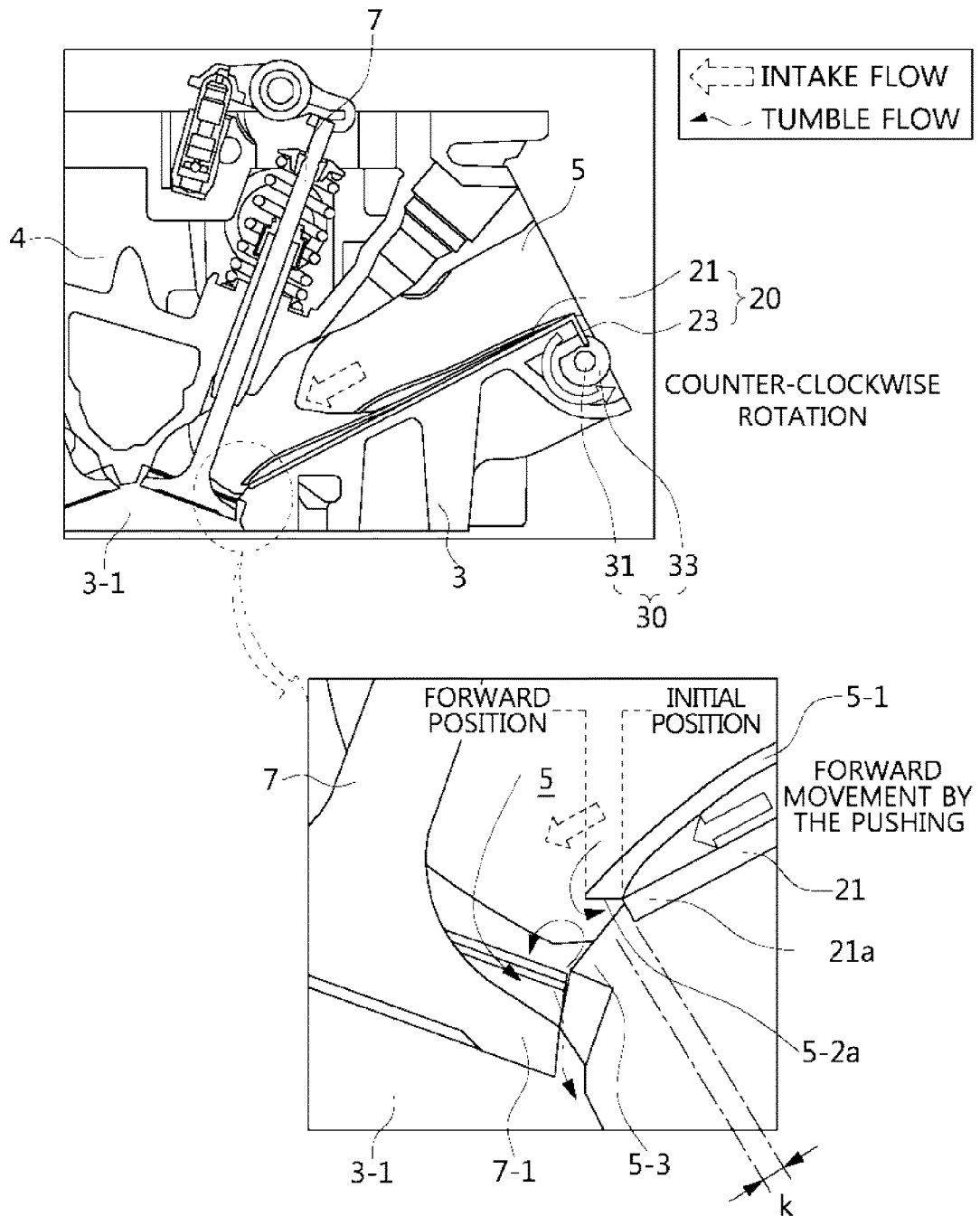
FIG. 6 is a view illustrating an operation status that the tumble formation of the variable charge motion system according to an exemplary embodiment of the present invention is varied by the pushing movement (the forward movement) of the moving member.

Meanwhile, FIG. 6 is a view illustrating the case that the variation of the high tumble flux and the low tumble flux in the VCM 10 is formed in the forward direction (that is, the opposite direction of the retreation movement) of the sliding plate 21.

In the instant case, in terms of the structure, the moving member 20 identically includes the sliding plate 21 and the fixing plate 23; and the intake port 5 identically forms the guide wall 5-1. However, the sliding plate 21 has a difference that the tumble end portion 21a is formed by the tumble inducing insertion interval (K); and the guide wall 5-1 is formed with a port boss end portion 5-2a protruded to the space of the guide wall 5-1 unlike the port end portion 5-2. Accordingly, the tumble end portion 21a is adhered with the port boss end portion 5-2a at the position of the tumble inducing insertion interval (K) to prevent the air from entering into the space of the guide wall 5-1.

Accordingly, in terms of the tumble flow, the sliding plate 21 has a difference to forwardly move in the direction opposite to the retreation movement of the sliding plate 21 of FIG. 1, FIG. 2, FIG. 3, FIG. 4, and FIG. 5 to convert the air which flows the pipeline of the intake port 5 from the high tumble flux to the low tumble flux. For the present purpose, the tumble inducing insertion interval (K) is reduced by the entry of the tumble end portion 21a into the port boss end portion 5-2a by the forward movement of the sliding plate 21; and consequently, the reduction of the tumble inducing insertion interval (K) lowers the interference effect of the tumble inducing insertion interval (K) in the communicating space and the air entering into the cylinder 3-1 in the pipeline is converted into the low tumble flux.

Accordingly, a fine position adjustment of the sliding plate 21 variably performed according to the engine operating condition using the variation of the PWM DUTY output of the controller 50 may more efficiently adjust the flow strength while continuously varying the tumble strength formed in the combustion chamber compared to the conventional VCM ON/OFF method.

As described above, the variable position shift type variable charge motion system 10 of the engine 1 according to an exemplary embodiment of the present invention is disposed on the intake port 5 forming the intake flow sent to the cylinder 3-1 in which the combustion chamber is formed by the connection of the cylinder block 3 an the cylinder head 4 to convert the intake flow of the air entering into the cylinder 3-1 from the high tumble flux into the low tumble flux by the sliding movement with respect to the intake port 5, enhancing the flow strength within the combustion chamber which corresponds to the enhancement of thermal efficiency of the gasoline engine without adding a hardware or excessively modifying a design, and to adjust the flow strength within the combustion chamber according to the operation range, continuously controlling the variation of the strength of the tumble flow.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A variable charge motion system, comprising:
a sliding plate disposed internal to a pipeline of an intake port connected to a combustion chamber, and slide and moved to induce a tumble flow with respect to an intake flow of air which flows in the pipeline and enters into the combustion chamber,
wherein the sliding plate is disposed along a guide wall formed in the pipeline.

2. The variable charge motion system of claim 1, wherein when the sliding plate moves to an intake flow direction of the pipeline by sliding movement following the guide wall, a interference weakens.

3. The variable charge motion system of claim 2, wherein the guide wall is formed with a port end portion into which an edge portion of the sliding plate is inserted.

4. The variable charge motion system of claim 3, wherein the guide wall is formed with a tumble protrusion forming a gap at a status that the edge portion of the sliding plate is inserted into the port end portion and is protrudingly formed to the pipeline.

5. The variable charge motion system of claim 1, wherein one end portion of a combustion chamber side of the guide wall is formed with a port boss end portion adhered at a status that the edge portion of the sliding plate is inserted.

6. The variable charge motion system of claim 5, wherein when the sliding plate moves to an reverse intake flow direction of the pipeline by the sliding movement following the guide wall, a interference weakens.

7. The variable charge motion system of claim 1, wherein the sliding movement is performed by a pulley connected to the sliding plate, and the pulley is rotated to the center axis of a rotation shaft.

8. The variable charge motion system of claim 7, wherein the pulley and the sliding plate are connected by a fixing plate, and the fixing plate is bent on the sliding plate.

9. The variable charge motion system of claim 1, wherein a distance of a sliding movement is adjusted by an engine operating condition of an engine.

10. An engine, comprising:
a cylinder formed with a combustion chamber by connection of a cylinder block and a cylinder head; and
a variable charge motion system slide and moved with respect to an intake port wherein a sliding plate, which is disposed along a guide wall of the intake port that intake flow sent to the cylinder is formed, converts the intake flow into a tumble flow.

11. The engine of claim 10, wherein the variable charge motion system includes:
a rotation member connected to the sliding plate and rotated to form the sliding movement;
an actuator rotating the rotation member; and
a controller configured for controlling the actuator by a Pulse Width Modulation (PWM) DUTY outputted by corresponding to an engine operating condition which is determined by a detection signal, as an input data, of a detector.

12. The engine of claim 11, wherein the controller is associated with a VCM map provided with a table in which an engine operating condition step and an output value of the PWM DUTY are matched.

13. The engine of claim 11, wherein the detection signal of the detector indicates a rotation number of the engine, a vehicle speed, a throttle opening amount, an Accelerator Pedal Scope (APS), an engine cooling water temperature, and an intake air temperature.

14. The engine of claim 11, wherein the sliding plate is divided into first and second moving members and disposed on each of the intake ports connected to first and second combustion chambers of the cylinder.

15. The engine of claim 14, wherein each of the first and second moving members is connected to the rotation member to operate together by rotation of the rotation member.

16. The engine of claim 15, wherein the rotation member is supported by the cylinder head to be rotated.

* * * * *